United States Patent
Chan

(10) Patent No.: US 8,352,534 B2
(45) Date of Patent: Jan. 8, 2013

(54) INTEGER DIVISION CIRCUIT WITH ALLOWABLE ERROR

(75) Inventor: Chen-Hung Chan, Taoyuan County (TW)

(73) Assignee: Altek Corporation, Hsinchu (TW)

( * ) Notice: Subject to any disclaimer, the term of this patent is extended or adjusted under 35 U.S.C. 154(b) by 1071 days.

(21) Appl. No.: 12/326,181

(22) Filed: Dec. 2, 2008

(65) Prior Publication Data

US 2010/0070547 A1 Mar. 18, 2010

(30) Foreign Application Priority Data

Sep. 12, 2008 (TW) .............................. 97135190 A

(51) Int. Cl.
*G06F 7/535* (2006.01)
(52) U.S. Cl. ....................................... 708/653
(58) Field of Classification Search ........................ None
See application file for complete search history.

(56) References Cited

U.S. PATENT DOCUMENTS

| | | | | |
|---|---|---|---|---|
| 6,321,245 B1 * | 11/2001 | Cukier et al. | ................ | 708/290 |
| 6,907,442 B2 * | 6/2005 | Ike | ................ | 708/653 |
| 7,290,025 B2 * | 10/2007 | Tanaka | ................ | 708/653 |
| 8,060,551 B2 * | 11/2011 | Avss et al. | ................ | 708/653 |
| 2002/0169814 A1 * | 11/2002 | Tanaka | ................ | 708/650 |
| 2005/0289209 A1 * | 12/2005 | Robison | ................ | 708/650 |
| 2006/0129624 A1 * | 6/2006 | Abdallah et al. | ................ | 708/650 |
| 2006/0129625 A1 * | 6/2006 | Olson et al. | ................ | 708/650 |
| 2009/0172069 A1 * | 7/2009 | Avss et al. | ................ | 708/653 |

* cited by examiner

*Primary Examiner* — David H Malzahn
(74) *Attorney, Agent, or Firm* — Rabin & Berdo, P.C.

(57) ABSTRACT

An integer division circuit with allowable error is described, what a signal processing apparatus includes a pointer, a first left shifter, a second left shifter, a subtractor, a multiplier, and a right shifter. The pointer searches for a most significant non-zero bit of a divisor and outputs a most significant byte value. The first left shifter performs a shift operation according to the most significant byte value, so as to generate a first exponential coefficient. The second left shifter performs a shift operation according to the most significant byte value, so as to generate a second exponential coefficient. The subtractor calculates a multiplier factor according to the divisor, the first exponential coefficient, and the second exponential coefficient and outputs the multiplier factor to the multiplier. The multiplier multiplies an input value with the multiplier factor and outputs a result to the right shifter. The right shifter outputs a calculation result.

3 Claims, 2 Drawing Sheets

INTEGER DIVISION CIRCUIT WITH ALLOWABLE ERROR

CROSS-REFERENCE TO RELATED APPLICATIONS

This non-provisional application claims priority under 35 U.S.C. §119(a) on Patent Application No(s). 097135190 filed in Taiwan, R.O.C. on Sep. 12, 2008 the entire contents of which are hereby incorporated by reference.

BACKGROUND OF THE INVENTION

1. Field of the Invention

The present invention relates to an arithmetic circuit, and more particularly to an arithmetic circuit using a bit arithmetic unit to perform an integer division on digital image signals.

2. Related Art

In the conventional signal processing, as for integer division, multipliers are mostly adopted to obtain an approximate result:

$$R = \frac{N}{14} \qquad \text{Equation 1}$$

Then, "14" in Equation 1 is converted into a power of 2 (for example, "1024"), and then Equation 1 is modified into Equation 2:

$$R = \frac{N}{14} \approx \frac{73 \times N}{1024} \qquad \text{Equation 2}$$

According to Equation 2, General Equation 3 is obtained:

$$R = \frac{N}{D} \approx \frac{C \times N}{S} \qquad \text{Equation 3}$$
$$C = \frac{S}{D},$$

and the S is a power of 2. When the denominator is a power of 2, a right shift operation is used to replace the division operation in the prior art. Therefore, a divider can be achieved simply by one multiplier and a bit operation once, which is based upon the precondition that the divisor D should be a fixed value and needs to be simplified in advance when designing the circuit. However, in practice, the divisor D varies as the signal processing proceeds. Therefore, if it intends to replace the divider as above described, the multiplier factor C needs to be pre-stored in a memory of a computer device. The wider the variation range of the divisor D is, the more variables C needs to be stored, and thus, the memory space needs to be enlarged accordingly.

SUMMARY OF THE INVENTION

Accordingly, the present invention is directed to a signal processing apparatus, which is suitable for dynamically generating a multiplier factor (C) and a shift number (S) according to a divisor (D).

In order to achieve the above objective, the present invention provides a signal processing apparatus, which includes a pointer, a first left shifter, a second left shifter, a subtractor, and a right shifter. The pointer searches for a most significant non-zero bit of a divisor, so as to output a position of the most significant non-zero bit. The pointer is respectively electrically connected to the first left shifter and the second left shifter. The first left shifter performs a shift operation according to a most significant byte value to generate a first exponential coefficient. The second left shifter performs a shift operation according to the most significant byte value to generate a second exponential coefficient. The subtractor is electrically connected to the first left shifter and the second left shifter. The subtractor calculates a suitable multiplier factor according to the divisor, the first exponential coefficient, and the second exponential coefficient and outputs the multiplier factor to the multiplier. The multiplier multiplies an input value N with the multiplier factor and outputs a multiplication result to the right shifter. The right shifter performs an exponent right shift operation according to the multiplication result and outputs a calculation result.

The present invention provides an integer division circuit with allowable error, which utilizes exponential coefficients to perform linear interpolation calculation, such that the integer division circuit can replace the division operation by a bit operation and a multiplier, thereby reducing the hardware cost of the division circuit.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1:
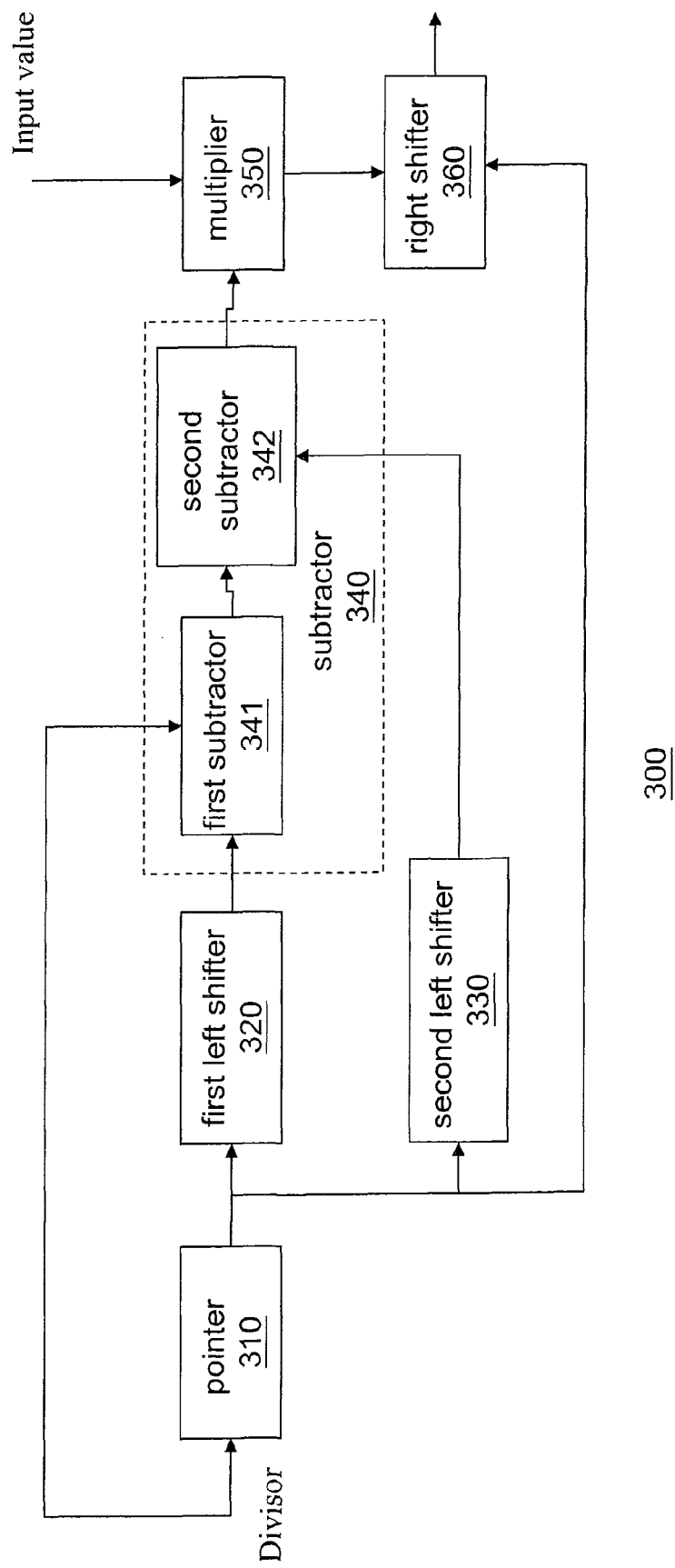
FIG. 1 is a schematic architectural view of a system of the present invention.

FIG. 1 is a schematic architectural view of a system of the present invention. Referring to FIG. 1, an integer division circuit with allowable error 300 includes a pointer 310, a first left shifter 320, a second left shifter 330, a subtractor 340, a multiplier 350, and a right shifter 360. After a divisor is input, the pointer 310 searches for a most significant non-zero bit of the divisor, so as to output a position of the most significant non-zero bit. The step of searching for the most significant byte is described as follows: the pointer 310 searches for the first non-zero bit sequentially from the most significant byte to the least significant byte and records a byte position value of this bit, so as to output a most significant byte value.

The pointer 310 is respectively electrically connected to the first left shifter 320 and the second left shifter 330. The first left shifter 320 performs a left shift operation according to the most significant byte value, so as to generate a first exponential coefficient. The second left shifter 330 performs a left shift operation according to the most significant byte value, so as to generate a second exponential coefficient.

The subtractor 340 is electrically connected to the first left shifter 320 and the second left shifter 330. The subtractor 340 outputs a multiplier factor according to the divisor, the first exponential coefficient, and the second exponential coefficient. The subtractor 340 further includes a first subtractor 341 and a second subtractor 342. The first subtractor 341 is electrically connected to the first left shifter 320, and the second subtractor 342 is electrically connected to the first subtractor 341 and the second left shifter 330.

The multiplier 350 is electrically connected to the subtractor 340 and respectively receives the multiplier factor and an input value. The multiplier 350 multiplies the multiplier factor with the input value and outputs a multiplication result to the right shifter 360. The right shifter 360 performs an exponent right shift operation on the multiplication result, so as to output a calculation result.

In order to illustrate an operation flow of the present invention more conveniently, an example is cited below, but the present invention is not merely limited to this application. It is assumed that an input divisor is "14 (1110b)", a dividend is "100 (1100100b)", and the value of "100/14" is required to be calculated. The first non-zero position value is searched from the most significant byte on the left to the least significant byte on the right of "1110b". Since the first non-zero position value of "1110b" is "4", the most significant byte value is "4".

The first left shifter performs an exponent left shift operation according to the most significant byte value "4" and subtracts 1 from the most significant byte value in this embodiment, so as to generate a first exponential coefficient "$2^{4-1}$". The second left shifter performs an exponent left shift operation according to the most significant byte value "4", so as to generate a second exponential coefficient "$2^4$".

The first subtractor 341 subtracts the first exponential coefficient from the divisor, so as to output a first temporary interpolation value "$14-2^3$". The second subtractor 342 subtracts the first temporary interpolation value "$14-2^3$" from the second exponential coefficient, so as to output a multiplier factor "$24-(14-2^3)$"="10".

Then, the right shifter 360 respectively receives a dividend "100" and the multiplier factor, and then performs an exponent right shift operation on an input value according to the multiplier factor, so as to output a calculation result, as indicated by the following mathematical expression:

$$R = \frac{10 \times 100}{128} \approx 7.$$

Figure 2:
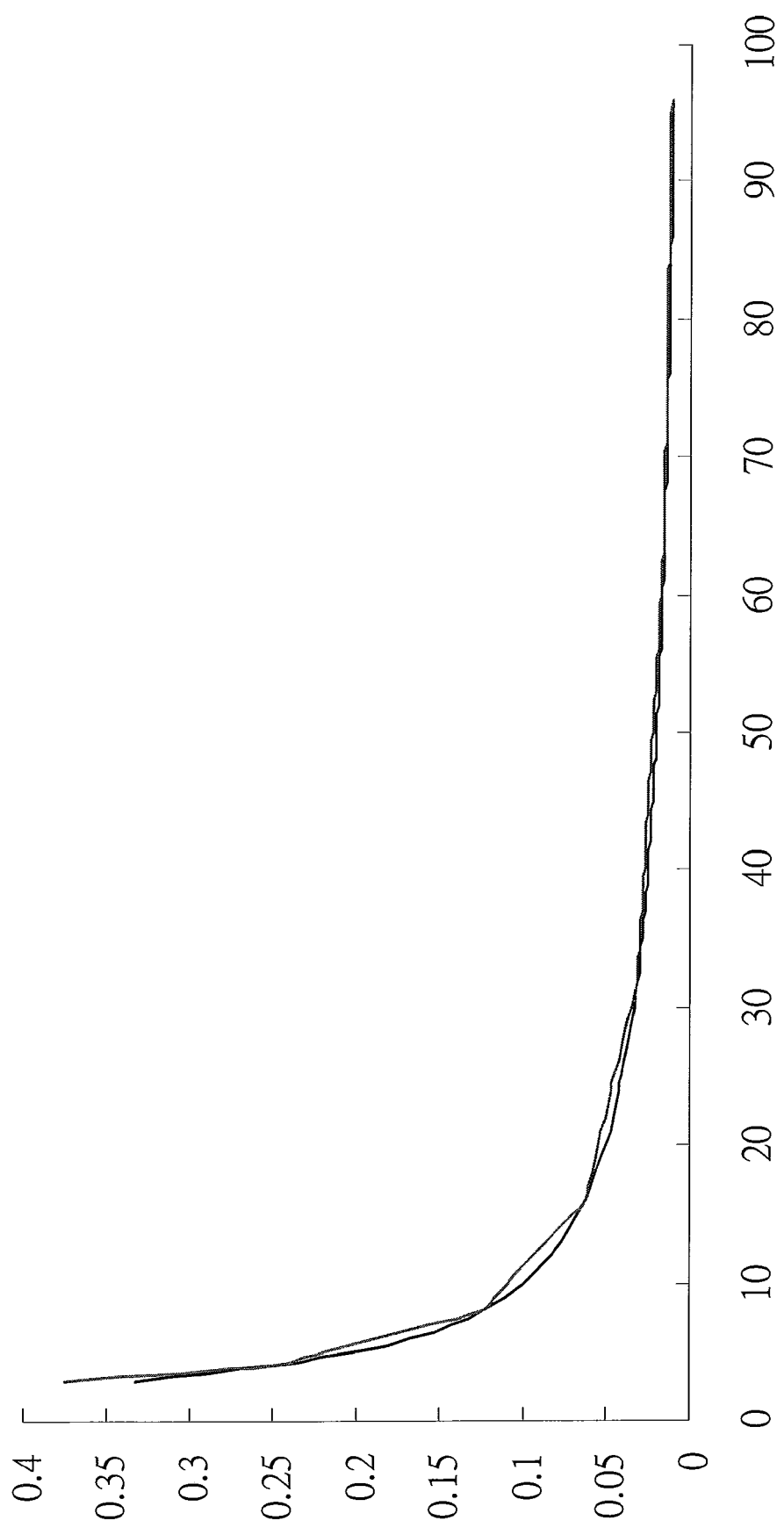
FIG. 2 shows error values of the present invention and the prior art.

The calculation result obtained at last is "$10*100/2^7=7.8125$". FIG. 2 shows error values of the present invention and a floating point divider. Referring to FIG. 2, the solid line represents calculation results of the floating point divider, and the dotted line represents calculation results of the present invention. According to the above example, severe errors occur when the divisor is smaller than 16, in which when the divisor is 3, the error is most severe, that is, 4.16%. Therefore, once being applied to some applications requiring higher accuracy, the present invention can record the multiplier factors smaller than 16 and only dynamically generate multiplier factors and shift numbers for values greater than 16. In such a manner, the maximum error of the present invention is only 0.005350 (0.535%), which is acceptable for some applications. Moreover, as for portable computer devices, the hardware configuration cost can be reduced, that is because almost the same operation results can be achieved merely by using the existing hardware architecture.

The integer division circuit with allowable error 300 provided by the present invention utilizes exponential coefficients to perform the linear interpolation calculation, such that the integer division circuit with allowable error 300 can replace the division operation by the bit operation, thereby reducing the hardware cost of the integer division circuit with allowable error 300.

What is claimed is:

1. An integer division circuit with an allowable error, comprising:
    a pointer, for searching for a most significant non-zero bit of a divisor and outputting a most significant byte value;
    a first left shifter, electrically connected to the pointer, for performing a shift operation according to the most significant byte value, so as to generate a first exponential coefficient;
    a second left shifter, electrically connected to the pointer, for performing a shift operation according to the most significant byte value, so as to generate a second exponential coefficient;
    a subtractor, electrically connected to the first left shifter and the second left shifter, for performing a weight adjustment procedure according to the divisor, the first exponential coefficient, and the second exponential coefficient, so as to output a multiplier factor;
    a multiplier that receives a dividend value; and
    a right shifter, for performing an exponent right shift operation on an output result of the multiplier by using the most significant byte value, so as to output a quotient value with the allowable error,
    wherein the multiplier is connected between the subtractor and the right shifter, the multiplier multiplying the multiplier factor with the dividend value and outputting a multiplication result to the right shifter for the exponent right shift operation.

2. The integer division circuit with the allowable error according to claim 1, wherein the pointer searches for a first non-zero bit sequentially from a most significant byte to a least significant byte of the divisor and records a byte position value of the first non-zero bit, so as to output the most significant byte value.

3. The integer division circuit with the allowable error according to claim 1, wherein the subtractor comprises a first subtractor and a second subtractor, the first subtractor is electrically connected to the first left shifter and the second subtractor is electrically connected to the first subtractor and the second left shifter, the first subtractor performs an interpolation calculation on the divisor and the first exponential coefficient to output a first temporary interpolation value, and the second subtractor performs an interpolation calculation on the first temporary interpolation value and the second exponential coefficient to output the multiplier factor.

* * * * *